US009106845B2

(12) United States Patent
Davis, III et al.

(10) Patent No.: US 9,106,845 B2
(45) Date of Patent: Aug. 11, 2015

(54) REMOTE DYNAMIC INDICATION OF SUPERVISORY CONTROL AND MONITORING

(75) Inventors: Charles Frederick Lee Davis, III, Lynbrook, NY (US); William M. Thompson, Lansdale, PA (US)

(73) Assignee: Predictive Edge Technologies, LLC, Horsham, PA (US)

( * ) Notice: Subject to any disclaimer, the term of this patent is extended or adjusted under 35 U.S.C. 154(b) by 0 days.

(21) Appl. No.: 13/155,145

(22) Filed: Jun. 7, 2011

(65) Prior Publication Data

US 2011/0299724 A1 Dec. 8, 2011

Related U.S. Application Data

(60) Provisional application No. 61/352,504, filed on Jun. 8, 2010.

(51) Int. Cl.
*H04L 29/02* (2006.01)
*H04N 1/32* (2006.01)
*G06Q 50/00* (2012.01)

(52) U.S. Cl.
CPC .......... *H04N 1/32101* (2013.01); *G06Q 50/01* (2013.01); *H04N 2201/3233* (2013.01)

(58) Field of Classification Search
CPC .......... G06Q 50/01; H04N 2201/3233; H04N 1/32101; H04N 5/44543; H04N 21/4532; G06F 3/0481; G06F 17/30035; H04L 63/10
USPC ...................... 726/3–7, 22–28; 709/204–206, 709/224–229; 715/706.708, 710, 741–747
See application file for complete search history.

(56) References Cited

U.S. PATENT DOCUMENTS

| 5,765,176 | A | 6/1998 | Bloomberg |
| 6,094,483 | A * | 7/2000 | Fridrich et al. ................. 380/28 |
| 6,216,228 | B1 * | 4/2001 | Chapman et al. ............. 713/176 |
| 6,556,688 | B1 * | 4/2003 | Ratnakar ....................... 382/100 |
| 7,451,218 | B2 | 11/2008 | Malik et al. |
| 7,571,466 | B2 | 8/2009 | Mitchell et al. |
| 7,600,019 | B2 | 10/2009 | Reasor et al. |
| 7,707,244 | B2 | 4/2010 | Malik et al. |
| 7,869,792 | B1 | 1/2011 | Zhou et al. |
| 7,930,730 | B2 * | 4/2011 | Brewer et al. ..................... 726/3 |
| 8,838,976 | B2 * | 9/2014 | Etchegoyen .................. 713/176 |
| 2002/0042824 | A1 | 4/2002 | Vinati et al. |
| 2002/0049806 | A1 | 4/2002 | Gatz et al. |
| 2002/0056049 | A1 | 5/2002 | Vinati et al. |
| 2003/0041143 | A1 | 2/2003 | Ronaldo et al. |

(Continued)

FOREIGN PATENT DOCUMENTS

WO WO 2005/057329 6/2005

OTHER PUBLICATIONS

Gina Fisk, Eric Weigle, Joshua Neil: "On the limitations of embedding data in immutable carriers", ACM, MM, 2002, 4 pages htpp://csag.ucsd.edu/individual/ehw/papers/ACM-MM-2002-VISA.pdf.*

(Continued)

*Primary Examiner* — Catherine Thiaw
(74) *Attorney, Agent, or Firm* — Dunlap Codding, P.C.

(57) ABSTRACT

A system and method for assigning unique and immutable attributes to user profiles and associated image(s) to facilitate the dynamic indication of supervisory control and monitoring through iconic representation, steganographic processing and/or encryption processing.

20 Claims, 2 Drawing Sheets

(56) References Cited

U.S. PATENT DOCUMENTS

| | | |
|---|---|---|
| 2003/0105950 A1 | 6/2003 | Hirano et al. |
| 2003/0187798 A1 | 10/2003 | McKinley et al. |
| 2005/0021618 A1* | 1/2005 | Isozaki .................. 709/204 |
| 2005/0060167 A1 | 3/2005 | Patron et al. |
| 2005/0160167 A1 | 7/2005 | Cheng et al. |
| 2005/0171832 A1 | 8/2005 | Hull et al. |
| 2005/0197922 A1 | 9/2005 | Pezaris et al. |
| 2007/0266114 A1* | 11/2007 | Heo ........................ 709/217 |
| 2008/0005325 A1 | 1/2008 | Wynn et al. |
| 2008/0088590 A1* | 4/2008 | Brown et al. .............. 345/168 |
| 2008/0129758 A1 | 6/2008 | Fox et al. |
| 2008/0162692 A1 | 7/2008 | Schultz et al. |
| 2008/0281710 A1 | 11/2008 | Hoal |
| 2009/0089417 A1 | 4/2009 | Giffin et al. |
| 2009/0132655 A1 | 5/2009 | Behrens |
| 2009/0144639 A1* | 6/2009 | Nims et al. ............... 715/757 |
| 2009/0144824 A1 | 6/2009 | Rinek |
| 2009/0187764 A1* | 7/2009 | Astakhov et al. .......... 713/170 |
| 2009/0187994 A1* | 7/2009 | Rapo et al. ............... 726/27 |
| 2009/0265757 A1 | 10/2009 | Light |
| 2010/0048242 A1 | 2/2010 | Rhoads et al. |
| 2010/0052852 A1* | 3/2010 | Mohanty .................. 340/5.83 |
| 2010/0082449 A1* | 4/2010 | Plautz ..................... 705/26 |
| 2010/0132043 A1* | 5/2010 | Bjorn et al. ............... 726/25 |
| 2010/0154065 A1* | 6/2010 | Cohen et al. ............. 726/28 |
| 2010/0262995 A1* | 10/2010 | Woods et al. ............. 725/40 |
| 2010/0281520 A1* | 11/2010 | Deguchi ................... 726/3 |
| 2010/0285871 A1 | 11/2010 | Shah et al. |
| 2011/0047265 A1 | 2/2011 | Withers et al. |
| 2011/0072039 A1 | 3/2011 | Tayloe |
| 2011/0145355 A1* | 6/2011 | Mattern ................... 709/206 |
| 2011/0179117 A1* | 7/2011 | Appelman et al. ......... 709/204 |
| 2011/0246572 A1* | 10/2011 | Kollenkark et al. ........ 709/204 |
| 2012/0084571 A1* | 4/2012 | Weis et al. ............... 713/184 |
| 2012/0311623 A1* | 12/2012 | Davis et al. ............... 725/18 |

OTHER PUBLICATIONS

Arati Baliga and Joe Kilian: "On covert collaboration", ACM, MM&Sec'07, 2007, pp. 25-33, Texas, USA.*
Canadian Application 2,801,589 Office Action dated Jun. 2, 2015, 4 pgs.

* cited by examiner

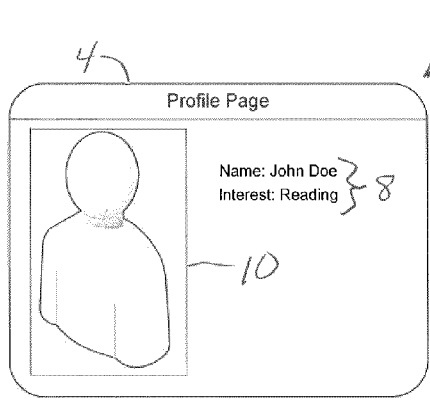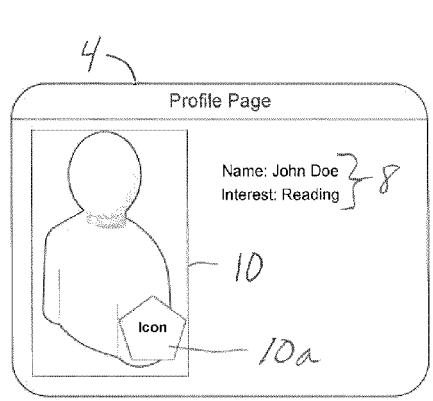
Figure 1
Figure 2

REMOTE DYNAMIC INDICATION OF SUPERVISORY CONTROL AND MONITORING

CROSS REFERENCE TO RELATED APPLICATION

This application claims the benefit of U.S. Provisional Application No. 61/352,504, filed Jun. 8, 2010, the disclosure of which is incorporated herein in its entirety by reference thereto.

FIELD OF THE INVENTION

The present invention relates in general to data security and integrity and, in particular, to systems and methods for remote dynamic indication of supervisory control and monitoring of individuals who are engaged in the use of digital social media on the Internet.

BACKGROUND OF THE INVENTION

Individuals using social media often have a profile that is resident to the social media platform they are using. The profile often allows a digital photograph to be included as part of the profile. In most instances, it is the profile and its associated digital photograph that is representative of the individual using the social media platform. The photograph is typically displayed to other individuals concurrently using the social media platform.

Presently, social media security systems and methods make no provision to ensure the image attached to the profile is representative, secure, or feature an independent process for secure management. Existing systems predominately rely upon the use of single factor security implementations, or password based systems, to secure the user account in its entirety and not the discrete photograph associated with a user account.

U.S. Patent Application Publication No. 2009/0265757 contemplates a system of security where the attribute includes an icon to indicate protection activity and settings. However, there is no provision for encryption or stenography with respect to an image or icon.

An advantage exists, therefore, for a system and method having the ability to modify an image such as a digital photograph with a dynamically generated, digitally encrypted icon that is both specific and unique to a subordinate or user account. The digitally immutable icon will visually represent that the subordinate profile account activity is being remotely monitored and/or recorded.

A further advantage exists for a system and method that employs a security identifier that may be undetectably embedded in an image using steganographic and/or encryption techniques to monitor, track, and potentially recall the image.

SUMMARY OF THE INVENTION

Broadly, the present invention is directed to a method and process for assigning unique and immutable properties to online profiles and images to indicate that a form of monitoring is present. More particularly, the invention provides a system and method to digitally alter an image to visually represent that the person depicted in the image is being monitored by some form of supervisory control, and/or the image includes a visually undetectable cipher that uniquely identifies the image and its control authority.

Other details, objects and advantages of the present invention will become apparent as the following description of the presently preferred embodiments and presently preferred methods of practicing the invention proceeds.

BRIEF DESCRIPTION OF THE DRAWINGS

The invention will become more readily apparent from the following description of preferred embodiments thereof shown, by way of example only, in the accompanying drawings wherein:

FIG. 1 is a view of a representative output of a computer display in which the system and method according to the invention may be implemented prior to implementation;

FIG. 2 is a view of a representative output of a computer display in which the system and method according to the invention may be implemented post implementation.

DETAILED DESCRIPTION OF THE INVENTION

Figure 3:
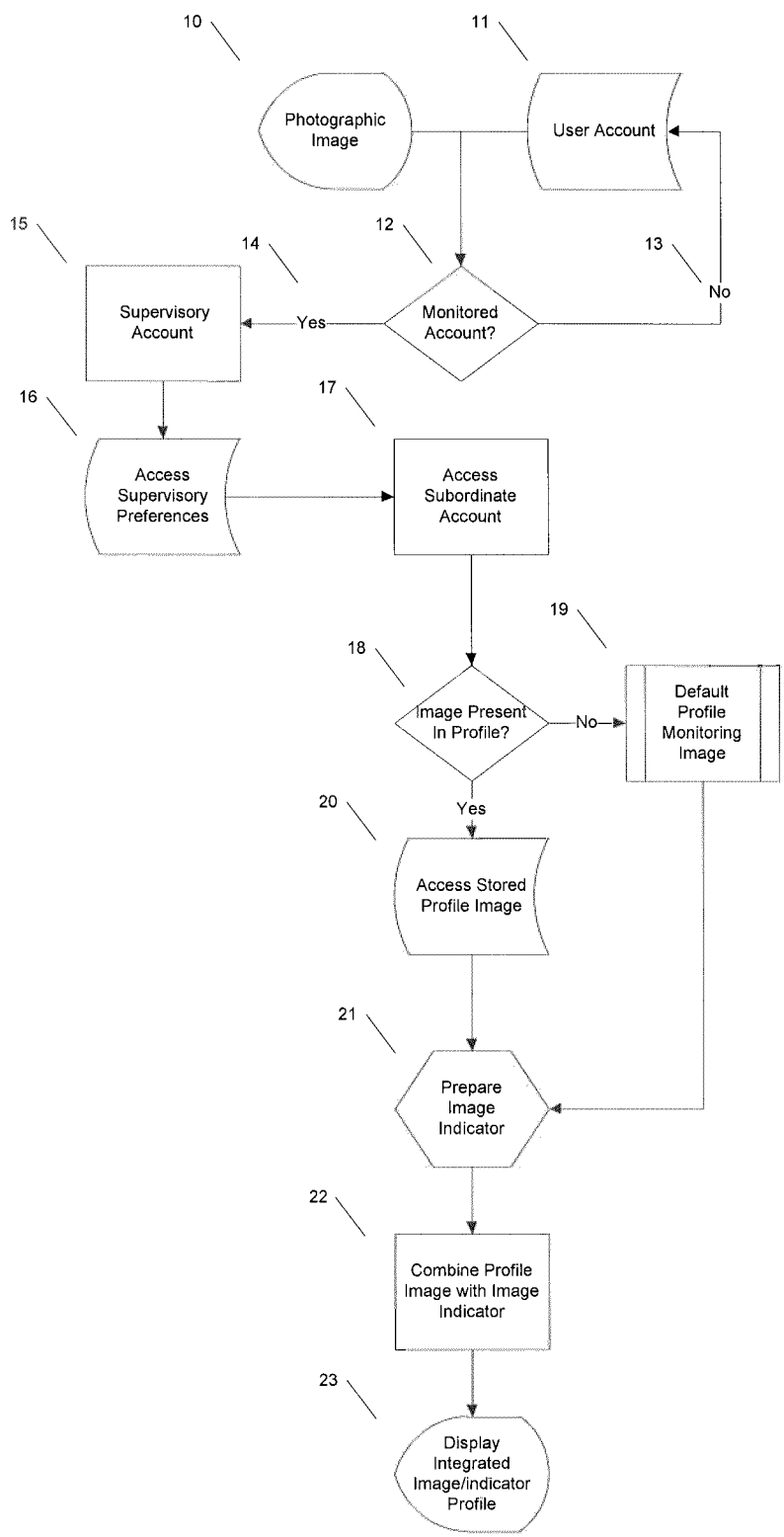
FIG. 3 is an algorithm of one embodiment of a method according to the invention for integrating discrete visual elements to provide dynamic indication.

Referring to the drawings wherein like or similar references indicate like or similar elements throughout the several views, there is shown in FIG. 1 a computer display in which the system and method according to the invention may be implemented prior to implementation, which display is identified generally by reference numeral 2. Display 2 may be the visual output means (typically a screen) of any suitable Web-enabled computerized device comprising, at minimum, a microprocessor coupled to a memory, including, without limitation, any presently known or hereinafter developed stationary or portable computer, personal digital assistant, or smart phone.

According to the invention, display 10 may convey any desired information regarding a user. In the illustrated example, display 10 generically includes certain information that may be observed on a user's profile page 4 of a typical social media website such as facebook.com, linkedin.com, or the like. As is conventional, profile page 4 may include either a stock (default) or personalized image 6 depicting a user as well as certain textual information 8 including, without limitation, the user's name (and possibly "interests"). It will be understood, however, that textual information may include some or all of the information one normally encounters on a social media website such as "education", "hometown", "current city", "present employer", "favorite books", "favorite music", "favorite movies", etc. FIG. 2 differs from FIG. 1 in that it further includes an icon 10a that may be displayed on the user's profile page and/or any page of the user's electronic social media location that bears the user's image 6. Preferably, icon 10a may be visible to the user and/or any visitor to such page(s).

Referring to FIG. 3, there is shown a process flow diagram according to the invention whereby a security identifier is assigned to a digital image. Initially, a digital photographic image 10 is linked to a subordinate or user account 11. Programmatically, a determination is made at 12 by evaluation of a control parameter as to whether the account is to feature dynamic indication of remote dynamic supervisory control and monitoring as contemplated by the present invention, i.e., whether the account 11 is to be a monitored account. If the control parameter does not indicate the need for remote dynamic supervisory control, then, as shown at 13, the process terminates with no change to the user account parameters and/or referenced photographic image.

However, as indicated at 14, if the control parameter does indicate the need for remote dynamic indication of supervisory control and monitoring, then a parameter is set in a supervisory account 15. The parameter governs access to the user account at 17 and related elements in addition to establishing access supervisory preferences 16 for the user account and related elements, including attached images and whether the image will be subject to steganographic encryption.

The user profile is accessed at 18 to determine if an image is present in the profile. If an image is not present, then, at 19, a default, generic image stored in memory is used by the system prior to additional processing.

If the user profile contains an image 10 uploaded by the profile owner for association with the user profile as indicated at 20, or is utilizing the default system image referenced at 19, both instances lead to the image being processed and prepared at 21 as an indicator for remote dynamic supervisory control and monitoring. The processing and preparation of the image that is now associated with the user profile can be iconic in nature as indicated by reference numeral 10*a* in FIG. 2 and/or include steganographic data and/or an encryption key depending on the preferences enabled in 16.

An example of steganographic alteration of the image as part of the process articulated in 21 could include, without limitation, minor transposition of the values of the red, green and blue values for a series of individual pixels, or hue, saturation, and intensity values of a series of individual pixels. The minor transposition of these values alters the digital values of known pixels, the elements that comprise the icon and/or image, but does not detectably alter the image when viewed. Other known steganographic techniques will be appreciated by those skilled in the art and would be suitable for use in connection with the present invention.

The transposed pixel values achieved through the process of stenography can serve as means for serializing the image and could also serve, without limitation, as the encryption key to both the image and/or the profile itself. The process of encryption, i.e., transformation of the data to make it unreadable by anyone other than the intended party, requires a digital key for both encryption and decryption. To the extent that the process calls for encryption or decryption of information, it is contemplated that the steganographic values articulated in 21 could constitute the key required for encryption or decryption irrespective of the encryption methodology employed.

At 22 the profile image 10 and image indicator (e.g., icon 10*a*) are combined. When completely integrated, the result is an integrated profile that includes a uniquely identifiable and immutable image/indicator contained within the user profile 23.

The advantages of the present invention include, without limitation, the ability to dynamically provide an indication that a user account, such as that used in social media, is being monitored by some form of supervisory or parental control, and that an associated image or images are being dynamically monitored and can be managed using steganographic technologies where the image itself contains immutable data that uniquely identifies the profile with which it is associated.

Although the invention has been described in detail for the purpose of illustration, it is to be understood that such detail is solely for that purpose and that variations can be made therein by those skilled in the art without departing from the spirit and scope of the invention as claimed herein.

What is claimed is:

1. In the use of digital social media on the Internet, a method using a computer connected to the Internet comprising a microprocessor coupled to a memory and a display, said method comprising the steps of:
    (a) linking an image to a supervised user account of a social network on the Internet, the supervised user account having a profile page, the supervised user account having a control parameter to enable dynamic indication of remote dynamic supervisory control and monitoring;
    (b) preparing an immutable image indicator for combination with said image, the immutable image indicator showing that a supervisory or parent account monitors the supervised user account;
    (c) combining the immutable image indicator with said image;
    (d) displaying, on a display in communication with said microprocessor and said memory, to a user visiting the profile page, the combined immutable image indicator and image on the profile page of the supervised user account.

2. The method of claim 1 wherein such immutable image indicator comprises a visible icon.

3. The method of claim 1 wherein such immutable image indicator comprises immutable steganographically generated data.

4. The method of claim 3 wherein such immutable image indicator further comprises an encryption key.

5. The method of claim 1 wherein such immutable image indicator comprises an encryption key.

6. The method of claim 1 wherein said image is a user selected digital photograph.

7. The method of claim 1 wherein said image is a stock digital photograph.

8. The method of claim 1 further comprising, prior to step (b), setting a parameter in a supervisory account for governing access to said supervised user account and for establishing access for supervisory preference for said user account.

9. The method of claim 1 further comprising, prior to step (a), setting the control parameter to enable dynamic indication of remote dynamic supervisory control and monitoring of the supervised user account.

10. The method of claim 1, wherein in the step of combining the immutable image indicator with said image, the immutable image indicator is combined with the image on the profile page.

11. A system comprising:
    means for linking an image to a supervised user account of a social network on the Internet, the supervised user account having a profile page, the supervised user account having a control parameter to enable dynamic indication of remote dynamic supervisory control and monitoring;
    means for preparing an immutable image indicator for combination with said image, the immutable image indicator showing that a supervisory or parent account monitors the supervised user account;
    means for combining such immutable image indicator with said image; and,
    a display displaying to a user visiting the profile page, the combined immutable image indicator and image on the profile page of the supervised user account.

12. The system of claim 11 wherein such immutable image indicator comprises a visible icon.

13. The system of claim 11 wherein such immutable image indicator comprises immutable steganographically generated data.

14. The system of claim 13 wherein such immutable image indicator further comprises an encryption key.

15. The system of claim 11 wherein such immutable image indicator comprises an encryption key.

16. The system of claim 11 wherein said image is a user selected digital photograph.

17. The system of claim 11 wherein said image is a stock digital photograph.

18. The system of claim 11 further comprising means for setting a parameter in a supervisory account for governing access to said supervised user account and for establishing access for supervised preference for such supervised user account.

19. The system of claim 11 further comprising means for identifying said supervised user account as a monitored account.

20. The system of claim 11, wherein the image has an outer boundary, and wherein the display displaying the combined immutable image indicator displays the immutable image indicator within the outer boundary of the image.

* * * * *